US009362848B2

(12) United States Patent
Trainer

(10) Patent No.: US 9,362,848 B2
(45) Date of Patent: Jun. 7, 2016

(54) HYBRID AC/DC CONVERTER FOR HVDC APPLICATIONS

(75) Inventor: David Reginald Trainer, Alvaston (GB)

(73) Assignee: Alstom Technology Ltd., Baden (CH)

( * ) Notice: Subject to any disclaimer, the term of this patent is extended or adjusted under 35 U.S.C. 154(b) by 0 days.

(21) Appl. No.: 14/359,088

(22) PCT Filed: Nov. 17, 2011

(86) PCT No.: PCT/EP2011/070402
§ 371 (c)(1),
(2), (4) Date: May 16, 2014

(87) PCT Pub. No.: WO2013/071975
PCT Pub. Date: May 23, 2013

(65) Prior Publication Data
US 2014/0293668 A1  Oct. 2, 2014

(51) Int. Cl.
*H02M 7/49* (2007.01)
*H02M 7/483* (2007.01)
(Continued)

(52) U.S. Cl.
CPC .............. *H02M 7/68* (2013.01); *H02M 7/5388* (2013.01); *H02M 7/797* (2013.01); *H02J 3/36* (2013.01);
(Continued)

(58) Field of Classification Search
CPC ............. H02J 3/36; H02M 7/42; H02M 7/44; H02M 7/48; H02M 7/483; H02M 7/49; H02M 7/5387; H02M 7/797; H02M 7/7575; H02M 2007/4835
USPC ................. 363/15–17, 34–35, 37–43, 50–55, 363/56.01–56.05, 57–58, 84–89, 95–98, 363/123, 127, 131–132, 135–138, 125
See application file for complete search history.

(56) References Cited

U.S. PATENT DOCUMENTS 3,857,083 A  12/1974 Lundstrom
3,867,643 A   2/1975 Baker et al.
(Continued)

FOREIGN PATENT DOCUMENTS

CN   101 795 072 A    8/2010
DE    43 17 965 A1   12/1994
(Continued)

OTHER PUBLICATIONS

Office Action in U.S. Appl. No. 13/639,844, mailed on May 22, 2014.
(Continued)

*Primary Examiner* — Timothy J Dole
*Assistant Examiner* — Ivan Laboy Andino
(74) *Attorney, Agent, or Firm* — Nixon Peabody LLP; Khaled Shami

(57) ABSTRACT

A power electronic converter, for connecting AC and DC networks and transferring power therebetween, comprises: first and second DC terminals for connection in use to a DC network; at least one primary converter limb extending between the first and second DC terminals and having first and second primary limb portions separated by a primary AC terminal for connection in use to a respective phase of a multi-phase AC network, at least one of the first and second primary limb portions including at least one primary active switching module to selectively allow current to flow through the corresponding primary converter limb in a first direction from the corresponding primary AC terminal to the DC terminals and in a second direction from the DC terminals to the corresponding primary AC terminal; and at least one secondary converter limb extending between the first and second DC terminals and having first and second secondary limb portions separated by a secondary AC terminal for connection in use to a further respective phase of the said multi-phase AC network, each of the first and second secondary limb portions including at least one passive current check element to limit current flow through the corresponding secondary converter limb to a single direction from the corresponding secondary AC terminal to the DC terminals.

9 Claims, 9 Drawing Sheets

(51) Int. Cl.
*H02M 7/68* (2006.01)
*H02M 7/5388* (2007.01)
*H02M 7/797* (2006.01)
*H02J 3/36* (2006.01)

(52) U.S. Cl.
CPC ............... *H02M 7/483* (2013.01); *H02M 7/49* (2013.01); *H02M 2007/4835* (2013.01); *Y02E 60/60* (2013.01)

(56) References Cited

U.S. PATENT DOCUMENTS

| | | |
|---|---|---|
| 4,053,820 A | 10/1977 | Peterson et al. |
| 4,300,181 A | 11/1981 | Premerlani |
| 4,636,907 A | 1/1987 | Howell |
| 4,658,227 A | 4/1987 | Howell et al. |
| 4,663,702 A | 5/1987 | Tanaka |
| 4,816,736 A | 3/1989 | Dougherty et al. |
| 5,027,264 A | 6/1991 | DeDoncker et al. |
| 5,093,583 A | 3/1992 | Mashino et al. |
| 5,164,872 A | 11/1992 | Howell |
| 5,339,210 A | 8/1994 | Howell |
| 5,345,375 A | 9/1994 | Mohan |
| 5,499,178 A | 3/1996 | Mohan |
| 5,515,264 A | 5/1996 | Stacey |
| 5,532,575 A | 7/1996 | Ainsworth et al. |
| 5,561,595 A | 10/1996 | Smith |
| 5,644,482 A | 7/1997 | Asplund |
| 5,673,189 A | 9/1997 | Schettler |
| 5,719,486 A | 2/1998 | Taniguchi et al. |
| 5,726,557 A | 3/1998 | Umeda et al. |
| 5,870,293 A | 2/1999 | Svensson et al. |
| 5,889,667 A | 3/1999 | Bernet |
| 5,892,677 A | 4/1999 | Chang |
| 5,936,855 A | 8/1999 | Salmon |
| 5,999,422 A | 12/1999 | Goransson et al. |
| 6,134,126 A | 10/2000 | Ikekame et al. |
| 6,137,704 A * | 10/2000 | Ito .................. H02M 5/458 363/132 |
| 6,236,580 B1 | 5/2001 | Aiello et al. |
| 6,301,130 B1 | 10/2001 | Aiello et al. |
| 6,320,767 B1 | 11/2001 | Shimoura et al. |
| 6,392,348 B1 | 5/2002 | Dougherty |
| 6,603,675 B1 | 8/2003 | Norrga |
| 6,879,062 B2 | 4/2005 | Oates |
| 6,987,680 B2 | 1/2006 | Vire et al. |
| 7,050,311 B2 | 5/2006 | Lai et al. |
| 7,170,767 B2 | 1/2007 | Bixel |
| 7,199,535 B2 * | 4/2007 | Welchko et al. ............. 318/105 |
| 7,274,576 B1 | 9/2007 | Zargari et al. |
| 7,292,462 B2 | 11/2007 | Watanabe et al. |
| 7,298,115 B2 | 11/2007 | Nishimura et al. |
| 7,499,291 B2 | 3/2009 | Han |
| 7,622,825 B2 | 11/2009 | Brune et al. |
| 7,729,144 B2 | 6/2010 | Urakabe et al. |
| 8,188,720 B2 | 5/2012 | Kim et al. |
| 8,294,408 B2 * | 10/2012 | Matt et al. .................... 318/727 |
| 8,390,259 B2 | 3/2013 | Dommaschk et al. |
| 8,599,591 B2 | 12/2013 | Crookes et al. |
| 8,854,843 B2 | 10/2014 | Trainer et al. |
| 8,861,231 B2 | 10/2014 | Cross et al. |
| 8,861,234 B2 | 10/2014 | Trainer et al. |
| 8,867,242 B2 | 10/2014 | Clare et al. |
| 8,867,244 B2 | 10/2014 | Trainer et al. |
| 8,891,209 B2 | 11/2014 | Hafner et al. |
| 8,934,268 B2 | 1/2015 | Trainer et al. |
| 9,065,299 B2 | 6/2015 | Trainer et al. |
| 2002/0060497 A1 | 5/2002 | Arita et al. |
| 2002/0149953 A1 * | 10/2002 | Smedley .............. H02J 3/01 363/84 |
| 2002/0176265 A1 | 11/2002 | Oates |
| 2003/0202367 A1 | 10/2003 | Schreiber |
| 2004/0218318 A1 | 11/2004 | Bijlenga et al. |
| 2005/0127853 A1 | 6/2005 | Su |
| 2005/0135126 A1 | 6/2005 | Gazel et al. |
| 2005/0146226 A1 | 7/2005 | Trainer et al. |
| 2008/0002443 A1 | 1/2008 | Ueda et al. |
| 2008/0007978 A1 | 1/2008 | Han |
| 2008/0137383 A1 * | 6/2008 | Chang .................. H02J 3/382 363/37 |
| 2008/0179951 A1 | 7/2008 | Brune et al. |
| 2008/0205093 A1 | 8/2008 | Davies et al. |
| 2008/0258661 A1 * | 10/2008 | Nagashima et al. ...... 318/400.29 |
| 2008/0310205 A1 | 12/2008 | Hiller |
| 2009/0021966 A1 | 1/2009 | Jacobson et al. |
| 2009/0027934 A1 | 1/2009 | Bustos |
| 2009/0033254 A1 * | 2/2009 | Nagashima et al. ........... 318/139 |
| 2009/0085548 A1 | 4/2009 | Suh et al. |
| 2009/0102436 A1 | 4/2009 | Valderrama et al. |
| 2009/0116268 A1 | 5/2009 | Kishida et al. |
| 2009/0206781 A1 | 8/2009 | Itoh et al. |
| 2010/0067266 A1 | 3/2010 | Dommaschk et al. |
| 2010/0118578 A1 | 5/2010 | Dommaschk et al. |
| 2010/0309698 A1 | 12/2010 | Asplund et al. |
| 2011/0018481 A1 | 1/2011 | Hiller |
| 2011/0044077 A1 | 2/2011 | Nielsen |
| 2011/0149622 A1 * | 6/2011 | Lin .................. H02M 1/4208 363/124 |
| 2011/0205768 A1 | 8/2011 | Svensson |
| 2011/0260701 A1 | 10/2011 | Horger et al. |
| 2011/0280049 A1 | 11/2011 | Mori et al. |
| 2012/0026767 A1 | 2/2012 | Inoue et al. |
| 2012/0063185 A1 * | 3/2012 | Janning .................... 363/126 |
| 2012/0069610 A1 | 3/2012 | Trainer et al. |
| 2012/0120697 A1 | 5/2012 | Cuk |
| 2012/0127766 A1 | 5/2012 | Crookes et al. |
| 2012/0170338 A1 | 7/2012 | Trainer et al. |
| 2012/0182771 A1 | 7/2012 | Trainer et al. |
| 2012/0188803 A1 | 7/2012 | Trainer et al. |
| 2012/0195084 A1 * | 8/2012 | Norrga ....................... 363/127 |
| 2012/0234796 A1 | 9/2012 | Juhlin |
| 2013/0020881 A1 | 1/2013 | Panousis et al. |
| 2013/0026841 A1 * | 1/2013 | Hosini et al. .................. 307/77 |
| 2013/0051105 A1 | 2/2013 | Wang et al. |
| 2013/0094264 A1 | 4/2013 | Crookes et al. |
| 2013/0099572 A1 * | 4/2013 | Norrga .................. H02M 3/335 307/43 |
| 2013/0119970 A1 | 5/2013 | Trainer et al. |
| 2013/0128629 A1 | 5/2013 | Clare et al. |
| 2013/0128636 A1 | 5/2013 | Trainer et al. |
| 2013/0182467 A1 | 7/2013 | Cross et al. |
| 2013/0194838 A1 | 8/2013 | Jang et al. |
| 2013/0208514 A1 | 8/2013 | Trainer et al. |
| 2013/0208521 A1 | 8/2013 | Trainer et al. |
| 2013/0279211 A1 | 10/2013 | Green et al. |
| 2014/0098575 A1 | 4/2014 | Whitehouse |
| 2014/0133196 A1 | 5/2014 | Trainer |
| 2014/0146583 A1 | 5/2014 | Trainer et al. |
| 2014/0254205 A1 | 9/2014 | Trainer et al. |
| 2014/0293656 A1 | 10/2014 | Trainer et al. |
| 2014/0293668 A1 | 10/2014 | Trainer et al. |
| 2014/0313797 A1 | 10/2014 | Davidson et al. |
| 2015/0009594 A1 | 1/2015 | Okaeme et al. |
| 2015/0116881 A1 | 4/2015 | Burnett et al. |
| 2015/0131189 A1 | 5/2015 | Davidson et al. |

FOREIGN PATENT DOCUMENTS

| | | |
|---|---|---|
| DE | 195 35 552 | 4/1996 |
| DE | 101 03 031 | 7/2002 |
| DE | 10 2005 040 432 A1 | 3/2007 |
| DE | 10 2007 003 172 | 2/2008 |
| DE | 10 2008 045 247 | 3/2008 |
| DE | 10 2008 014 898 A1 | 9/2009 |
| DE | 10 2010 007 452 A1 | 8/2011 |
| EP | 0 867 998 B1 | 3/2007 |
| EP | 1 800 391 | 6/2007 |
| GB | 2 294 821 | 5/1996 |
| GB | 2 375 902 A | 11/2002 |
| GB | 2 418 079 | 3/2006 |
| JP | 2008 125310 A | 5/2008 |
| WO | 97/02639 | 1/1997 |
| WO | 02/50972 A1 | 6/2002 |
| WO | 02/063758 | 8/2002 |

(56) References Cited

FOREIGN PATENT DOCUMENTS

| | | |
|---|---|---|
| WO | 03/055048 | 7/2003 |
| WO | 2007/023061 | 3/2007 |
| WO | 2007/028349 | 3/2007 |
| WO | 2007/028350 | 3/2007 |
| WO | 2007/033852 A1 | 3/2007 |
| WO | 2008/024038 | 2/2008 |
| WO | 2008/086760 | 7/2008 |
| WO | 2009/149743 | 12/2009 |
| WO | 2010/025758 | 3/2010 |
| WO | 2010/040388 A1 | 4/2010 |
| WO | 2010/069371 | 6/2010 |
| WO | 2010/088969 | 8/2010 |
| WO | 2010/112523 | 10/2010 |
| WO | 2010/145688 | 12/2010 |
| WO | 2010/145689 | 12/2010 |
| WO | 2010/145690 | 12/2010 |
| WO | WO 2010/149200 A1 | 12/2010 |
| WO | 2011/012171 | 2/2011 |
| WO | 2011/012174 | 2/2011 |
| WO | WO 2011/015227 A1 | 2/2011 |
| WO | 2011/029480 A1 | 3/2011 |
| WO | 2011/044928 A1 | 4/2011 |
| WO | 2011/050832 A1 | 5/2011 |
| WO | 2011/050847 | 5/2011 |
| WO | 2011/098117 | 8/2011 |
| WO | 2011/113471 | 9/2011 |
| WO | 2011/116816 A1 | 9/2011 |
| WO | 2011/124258 | 10/2011 |
| WO | 2011/127980 | 10/2011 |
| WO | WO 2011/124258 A1 | 10/2011 |
| WO | 2011/141054 A1 | 11/2011 |
| WO | 2011/157300 | 12/2011 |
| WO | 2012/007040 A1 | 1/2012 |
| WO | 2012/013248 | 2/2012 |
| WO | 2012/025142 | 3/2012 |
| WO | 2012/167826 | 12/2012 |
| WO | 2013/000510 | 1/2013 |
| WO | 2013/071975 | 5/2013 |
| WO | 2013/017160 A1 | 7/2013 |
| WO | 2013/017177 A1 | 7/2013 |
| WO | 2013/127461 A1 | 9/2013 |
| WO | 2013/127462 A1 | 9/2013 |
| WO | 2013/127463 A1 | 9/2013 |

OTHER PUBLICATIONS

Notice of Allowance in U.S. Appl. No. 13/640,468, mailed on Jun. 4, 2014.

Notice of Allowance in U.S. Appl. No. 13/813,414, mailed on Jun. 2, 2014.

Notice of Allowance in U.S. Appl. No. 13/818,654, mailed on May 30, 2014.

U.S. Appl. No. 14/357,908, filed May 13, 2014.

Allebrod, S. et al., "New Transformerless, Scalable Modular Multilevel Converters for HVDC-Transmission", Power Electronics Specialists Conference, IEEE, Jun. 15, 2008, pp. 174-179.

Baran, M. E. et al., "Overcurrent Protection in DC Zonal Shipboard Power Systems using Solid State Protection Devices", Electric Ship Technologies Symposium, 2007, ESTS '07, IEEE, IEEE, PI, May 1, 2007, pp. 221-224.

Glinka, M., "Prototype of Multiphase Modular-Multilevel-Converter with 2MW Power Rating and 17-Level-Output-Voltage", 2004 35th Annual IEEE Power Electronics Specialists Conference, Jun. 20-25, 2004, pp. 2572-2576.

Guanjun Ding, et al., "New Technologies of Voltage Source Converter (VSC) for HVDC Transmission System Based on VSC", Power and Energy Society General Meeting—Conversion and Delivery of Electrical Energy in the 21st Century, 2008 IEEE, IEEE, Piscataway, NJ, USA, Jul. 20, 2008, pp. 1-8.

Hagiwara, Makoto et al., "PWM Control and Experiment of Modular Multilevel Converters", Power Electronics Specialists Conference (PESC), Rhodes, Jun. 15-19, 2008, IEEE, pp. 154-161.

Hongbo, Jiang, et al., "Harmonic Cancellation of a Hybrid Converter", High Power Electronics, The Royal Institute of Technology, Stockholm Sweden, IEEE Transactions on Power Delivery, vol. 13, No. 4, Oct. 1998, pp. 1291-1296.

Knudsen, L. et al., "Description and Prospective Applications of New Multi-Terminal HVDC System Concepts", CIGRE Conf. Internationale Des Grands Reseaux Electriques, Aug. 26-Sep. 1, 1990, pp. 1-11.

Lesnicar, A. et al., "A New Modular Voltage Source Inverter Topology", European Power Electronics Conference (EPE), Toulouse, France, Sep. 2-4, 2003, 10 pages.

Lesnicar, A. et al., "An Innovative Modular Multilevel Converter Topology Suitable for a Wide Power Range", Power Tech Conference Proceedings, Bologna, Italy, Jun. 23-26, 2003, Bologna, IEEE, vol. 3, 2003, 6 pages.

Liu, Y.H. et al., A New STATCOM Configuration Using Multi-Level DC Voltage Reinjection for High Power Liu, Y.H. et al., "A New STATCOM Configuration Using Multi-Level DC Voltage Reinjection for High Power Application", IEEE Transactions on Power Delivery, vol. 19, No. 4, Oct. 2004, New Zealand, pp. 1828-1834.

Liu, Y.H. et al., "A New High-Pulse Voltage-Sourced Converter for HVdc Transmission", IEEE Transactions on Power Delivery, vol. 18, No. 4, Oct. 2003, New Zealand, pp. 1388-1393.

Qahraman, B. et al., "A VSC Based Series Hybrid Converter for HVDC Transmission", Canadian Conference Electrical and Computer Engineering Conference, 2005, CCECE/CCGEI, Saskatoon, Canada, May 1-4, 2005, pp. 458-461.

Raju, N.R., "A DC Link-Modulated Three-Phase Converter", Industry Applications Conference, 2001. Thirty-Sixth IAS Annual Meeting, Chicago, IL, Sep. 30, 2001-Oct. 4, 2001. Conference Record of the 2001 IEEE, vol. 4, pp. 2181-2185.

Su, Gui-Jia et al., "Multilevel DC Link Inverter for Brushless Permanent Magnet Motors with Very Low Inductance", Industry Applications Conference, 2001. Thirty-Sixth IAS Annual Meeting, Chicago, IL, Sep. 30, 2001-Oct. 4, 2001. Conference Record of the 2001 IEEE, vol. 2, pp. 829-834.

Wong, C. et al., "Feasibility Study of AC and DC-Side Active Filters for HDVC Converter Terminals", IEEE Transactions on Power Delivery, vol. 4, No. 4, Oct. 1989, New York, NY, USA, pp. 2067-2075.

Zhang, W. et al., "Active DC Filter for HVDC Systems", IEEE Computer Applications in Power, vol. 7, No. 1, Jan. 1994, New York, USA, pp. 40-44.

PCT International Search Report and Written Opinion for Application No. PCT/EP2009/057388, mailed on Mar. 18, 2010.

PCT International Preliminary Report on Patentability in International Application No. PCT/EP2009/057388, mailed on Dec. 14, 2011.

PCT International Search Report in International Application No. PCT/EP2009/057736, mailed on Mar. 26, 2010.

PCT International Preliminary Report on Patentability in International Application No. PCT/EP2009/057736, mailed on Nov. 24, 2011.

PCT International Search Report and Written Opinion in International Application No. PCT/EP2009/059973, mailed on Aug. 13, 2010.

PCT International Preliminary Report on Patentability in International Application No. PCT/EP2009/059973, mailed on Oct. 5, 2011.

PCT International Search Report and Written Opinion in International Application No. PCT/EP2010/051572, mailed on Jan. 19, 2011.

PCT International Preliminary Report on Patentability in International Application No. PCT/EP2010/051572, mailed on Apr. 20, 2012.

PCT International Search Report and Written Opinion in International Application No. PCT/EP2010/053290, mailed on Feb. 11, 2011.

PCT International Preliminary Report on Patentability in International Application No. PCT/EP2010/053290, mailed on Apr. 20, 2012.

PCT International Search Report and Written Opinion in International Application No. PCT/EP2010/054660, mailed on Feb. 24, 2011.

(56) References Cited

OTHER PUBLICATIONS

PCT International Preliminary Report on Patentability in International Application No. PCT/EP2010/054660, mailed on Jun. 6, 2012.
PCT International Search Report and Written Opinion for International Application No. PCT/EP2010/054974, mailed on Mar. 4, 2011.
PCT International Preliminary Report on Patentability in International Application No. PCT/EP2010/054974, mailed on Aug. 10, 2012.
PCT International Search Report and Written Opinion in International Application No. PCT/EP2010/058630, mailed on Apr. 19, 2011.
PCT International Preliminary Report on Patentability in International Application No. PCT/EP2010/058630, mailed on Dec. 19, 2012.
PCT International Search Report in International Application No. PCT/EP2010/061145, mailed on Jun. 5, 2011.
PCT International Preliminary Report on Patentability in International Application No. PCT/EP2010/061145, mailed on Aug. 20, 2012.
PCT International Search Report and Written Opinion in International Application No. PCT/EP10/62316, mailed on Jul. 6, 2011.
PCT International Search Report and Written Opinion in International Application No. PCT/EP2011/059514, mailed on Jul. 5, 2012.
PCT International Preliminary Report on Patentability in International Application No. PCT/EP2011/059514, mailed on Aug. 1, 2013.
PCT International Search Report in International Application No. PCT/EP2011/060907, mailed on Jul. 16, 2012.
PCT International Preliminary Report on Patentability in International Application No. PCT/EP2011/060907, mailed on Sep. 24, 2013.
PCT International Preliminary Report on Patentability in International Application No. PCT/EP2011/070402, mailed on Feb. 18, 2014.
First Chinese Office Action in Application No. 2009801607004, mailed Jun. 25, 2014.
Notice of Allowance in U.S. Appl. No. 13/378,336, mailed on Feb. 6, 2014.
Notice of Allowance in U.S. Appl. No. 13/378,336, mailed on Jun. 13, 2014.
Notice of Allowance in U.S. Appl. No. 13/380,500, mailed on Jun. 11, 2013.
Notice of Allowance in U.S. Appl. No. 13/380,500, mailed on Jul. 31, 2013.
Office Action in U.S. Appl. No. 13/388,277, mailed on Nov. 22, 2013.
Office Action in U.S. Appl. No. 13/388,277, mailed on Jul. 3, 2014.
Notice of Allowance in U.S. Appl. No. 13/576,920, mailed on Dec. 4, 2013.
Notice of Allowance in U.S. Appl. No. 13/576,920, mailed on Mar. 20, 2014.
Notice of Allowance in U.S. Appl. No. 13/576,920, mailed on Jun. 9, 2014.
PCT Search Report in PCT/EP2011/070402, Maximilian Kail, European Patent Office, Rijswijk, NL, Sep. 27, 2012.
Davidson, C.C et al., "Innovative Concepts for Hybrid Multi-Level Converters for HVDC Power Transmission", 9th IET International Conference on AC and DC Power Transmission, ACDC 2010, Oct. 19-21, 2010, 5 pages.
Ertl, H et al., "A Constant Output Current Three-Phase Diode Bridge Rectifier Employing a Novel Electronic Smoothing Inductor", IEEE Transactions on Industrial Electronics, vol. 52, Issue 2, Apr. 1, 2005, pp. 454-461.
Flourentzou, Nikolas et al., "VSC-Based HVDC Power Transmission Systems: An Overview", IEEE Transactions on Power Electronics, vol. 24, No. 3, Mar. 2009, pp. 592-602.

Merlin, M.M.C. et al. "A New Hybrid Multi-Level Voltage-Source Converter With DC Fault Blocking Capability", 9th IET International Conference on AC and DC Power Transmission, ACDC 2010, Oct. 19-21, 2010, 5 pages.
Watkins, S.J. et al., "Multilevel Asymmetric Power Converters for Switched Reluctance Machines", International Conference on Power Electronics, Machines and Drives, Apr. 16-18, 2002, IEEE 2002, Conf. Publ. No. 487, pp. 195-200.
PCT International Preliminary Report on Patentability in International Application No. PCT/EP10/62316, mailed on Mar. 7, 2013.
PCT International Search Report and Written Opinion in International Application No. PCT/EP2011/063207, mailed May 30, 2012.
PCT International Preliminary Report on Patentability in International Application No. PCT/EP2011/063207, mailed on Apr. 2, 2014.
PCT International Search Report and Written Opinion in International Application No. PCT/EP2011/064545, mailed Jun. 11, 2012.
PCT International Preliminary Report on Patentability in International Application No. PCT/EP2011/064545, mailed May 19, 2014.
PCT International Search Report and Written Opinion in International Application No. PCT/EP2012/053571, mailed on Jun. 20, 2012.
PCT International Preliminary Report on Patentability in International Application No. PCT/EP2012/053571, mailed on Sep. 12, 2014.
PCT International Search Report and Written Opinion in International Application No. PCT/EP2012/053574, mailed on Nov. 20, 2012.
PCT International Preliminary Report on Patentability in International Application No. PCT/EP2012/053574, mailed on Jul. 21, 2014.
PCT International Search Report and Written Opinion in International Application No. PCT/EP2012/053573, mailed on Dec. 4, 2012.
PCT International Preliminary Report on Patentability in International Application No. PCT/EP2012/053573, mailed on Jul. 21, 2014.
Office Action in U.S. Appl. No. 13/634,205, mailed on Sep. 22, 2014.
Notice of Allowance in U.S. Appl. No. 13/639,844, mailed on Sep. 8, 2014.
Notice of Allowance in U.S. Appl. No. 13/805,333, mailed on Feb. 2, 2015.
U.S. Appl. No. 14/379,746, filed Aug. 28, 2014.
U.S. Appl. No. 14/381,570, filed Aug. 27, 2014.
Office Action in U.S. Appl. No. 13/388,277, mailed on Oct. 7, 2015.
Office Action in U.S. Appl. No. 14/236,627, mailed on Dec. 7, 2015.
Office Action in U.S. Appl. No. 13/388,277, mailed on Mar. 18, 2015.
Notice of Allowance in U.S. Appl. No. 13/634,205, mailed on Apr. 27, 2015.
Office Action in U.S. Appl. No. 14/129,923, mailed on Feb. 17, 2015.
Office Action in U.S. Appl. No. 14/359,088, mailed on Apr. 7, 2015.
Notice of Allowance for U.S. Appl. No. 14/356,882 dated Jul. 20, 2015.
Office Action for U.S. Appl. No. 14/236,628 dated Jul. 31, 2015.
Office Action for U.S. Appl. No. 14/236,627 dated Aug. 4, 2015.
Office Action for U.S. Appl. No. 14/124,704 dated Aug. 28, 2015.
Office Action for U.S. Appl. No. 14/377,824 dated Sep. 1, 2015.
Office Action for U.S. Appl. No. 14/129,923 dated Sep. 18, 2015.
Notice of Allowance in U.S. Appl. No. 14/124,704, mailed on Feb. 12, 2016.
Corrected Notice of Allowability in U.S. Appl. No. 14/124,704, mailed on Apr. 14, 2016.
Notice of Allowance in U.S. Appl. No. 13/388,277, mailed on Feb. 23, 2016.
Office Action in U.S. Appl. No. 14/381,570, mailed on Mar. 16, 2016.
Notice of Allowance in U.S. Appl. No. 14/377,824, mailed on Mar. 22, 2016.
Office Action in U.S. Appl. No. 14/379,746, mailed on Mar. 23, 2016.

* cited by examiner

HYBRID AC/DC CONVERTER FOR HVDC APPLICATIONS

CROSS-REFERENCE TO RELATED PATENT APPLICATION

The present application is a National Stage Application of International Application No. PCT/EP2011/070402 entiltled "HYBRID AC/DC CONVERTER FOR HVDC APPLICATIONS" filed Nov. 17, 2011, the contents of which are incorporated herein by reference in their entirety.

FIELD

This invention relates to a power electronic converter for use in high/medium voltage direct current (HVDC) power transmission and reactive power compensation, and to a power electronic converter assembly.

BACKGROUND

In power transmission networks alternating current (AC) power is typically converted to direct current (DC) power for transmission via overhead lines and/or undersea cables. This conversion removes the need to compensate for the AC capacitive load effects imposed by the transmission line or cable, and thereby reduces the cost per kilometer of the lines and/or cables. Conversion from AC to DC thus becomes cost-effective when power needs to be transmitted over a long distance.

The conversion of AC to DC power is also utilized in power transmission networks where it is necessary to interconnect AC networks operating at different frequencies. In any such power transmission network, converters are required at each interface between AC and DC power to effect the required conversion, and one such form of converter is a voltage source converter (VSC).

A known voltage source converter is shown in FIG. 1 and includes a multilevel converter arrangement. The multilevel converter arrangement includes respective converter bridges 10 of cells 12 connected in series. Each converter cell 12 includes a pair of series-connected insulated gate bipolar transistors (IGBTs) 14 connected in parallel with a capacitor 16. The individual converter cells 12 are not switched simultaneously and the converter voltage steps are comparatively small, and so such an arrangement eliminates the problems associated with the direct switching of the series-connected IGBTs 14.

The capacitor 16 of each converter cell 12 must however have a high capacitive value in order to constrain the voltage variation at the capacitor terminals in such a multilevel converter arrangement. A DC side reactor 18 is also required in each converter bridge 10 to limit transient current flow between converter limbs 20, and thereby enable the parallel connection and operation of the converter limbs 20.

These factors lead to expensive, large and heavy equipment that has significant amounts of stored energy, which makes pre-assembly, testing and transportation of the equipment difficult.

SUMMARY

According to a first aspect of the invention, there is provided a power electronic converter, for connecting AC and DC networks and transferring power therebetween, comprising:

first and second DC terminals for connection in use to a DC network;

at least one primary converter limb extending between the first and second DC terminals and having first and second primary limb portions separated by a primary AC terminal for connection in use to a respective phase of a multi-phase AC network, at least one of the first and second primary limb portions including at least one primary active switching module to selectively allow current to flow through the corresponding primary converter limb in a first direction from the corresponding primary AC terminal to the DC terminals and in a second direction from the DC terminals to the corresponding primary AC terminal; and at least one secondary converter limb extending between the first and second DC terminals and having first and second secondary limb portions separated by a secondary AC terminal for connection in use to a further respective phase of the said multi-phase AC network, each of the first and second secondary limb portions including at least one passive current check element to limit current flow through the corresponding secondary converter limb to a single direction from the corresponding secondary AC terminal to the DC terminals.

The provision of at least one primary converter limb which is able selectively to allow current to flow therethrough in a first direction from the corresponding primary AC terminal to the DC terminals, and at least one secondary converter limb which also allows current to flow from the corresponding secondary AC terminal to the DC terminals, permits the power electronic converter of the invention to transfer power from an AC network to a DC network across the or each of the primary and secondary converter limbs. In this manner the power electronic converter provides full power transfer functionality from the AC network to the DC network.

In the meantime the inclusion of at least one primary converter limb which is able selectively to allow current to flow therethrough in a second direction from the DC terminals to the corresponding primary AC terminal permits the power electronic converter to transfer power from a DC network to an AC network across each of the primary converter limbs. Accordingly the power electronic converter remains able to provide power transfer between the DC network and the AC network, albeit at a reduced level.

A power electronic converter which has a greater degree of power transfer functionality in one direction is perfectly acceptable in certain power transfer applications. For example such a power electronic converter, i.e. a converter which provides full power transfer functionality from an AC network to a DC network, is well-suited to power transfer applications where there is a heavy bias towards the export of power to a DC network and a minimal need to import power, such as arises in renewable wind and tidal power generation where the required power transfer is predominately from the source to a distribution grid.

Meanwhile the inclusion of one or more passive current check elements in each first and second secondary limb portion reduces considerably the number of active switching modules, i.e. modules which are operable to change between different operating configurations, in the power electronic converter while maintaining the respective degrees of power transfer functionality between the AC and DC networks, as set out above.

Such passive current check elements are lighter, smaller, and simpler than active switching modules, and hence less expensive and more reliable too. The resulting power electronic converter is therefore able to provide a small, lightweight, inexpensive, and reliable means of connecting AC and DC networks and transferring power therebetween.

Preferably each of the first and second primary limb portions includes at least one primary active switching module.

The power electronic converter may be configured to facilitate power transfer from the AC network to the DC network using three AC phases, and power transfer from the DC network to the AC network using two AC phases. For example, the power electronic converter may include two primary converter limbs and one secondary converter limb, wherein the primary and secondary AC terminals are for connection in use to a respective phase of a three-phase AC network.

In embodiments of the invention, the power electronic converter may further include a primary controller to selectively switch each primary active switching module, the primary controller being configured to switch the primary active switching modules in at least one AC to DC power transfer mode and in a DC to AC power transfer mode.

The inclusion of such a primary controller helps to ensure desired operation of the power electronic converter in a required power transfer mode.

In such embodiments, the primary controller when operating in a first AC to DC power transfer mode may selectively switch the primary active switching modules in the or each primary converter limb to control the configuration of a primary AC waveform at the corresponding primary AC terminal, the or each primary AC waveform being configured to control the configuration of a secondary AC waveform at the secondary AC terminal of the or each secondary converter limb.

The inclusion of such a primary controller and the resulting ability to control the configuration of the or each secondary AC waveform help to ensure that a resulting rectified DC voltage presented to the DC network has desirable characteristics.

In other such embodiments, the primary controller when operating in a DC to AC power transfer mode may selectively switch the primary active switching modules in the or each primary converter limb to synthesise a primary AC waveform at the corresponding primary AC terminal, the or each primary waveform having a configuration which inhibits the synthesis of a secondary AC waveform at the second AC terminal of the or each secondary converter limb.

The provision of such a primary controller and the resulting ability to synthesise a primary AC waveform at the or each primary AC terminal while inhibiting the synthesis of a secondary AC waveform at the or each secondary AC terminal, permit the power electronic converter to transfer a reduced level of power to the AC network via the or each primary converter limb.

Preferably each primary active switching module includes at least one primary active switching element.

Active switching elements have fast switching capabilities and so facilitate the control and/or synthesis of a primary AC waveform having a desired configuration, i.e. shape.

Each primary active switching module preferably includes one or more primary active switching elements connected in parallel with an energy storage device to selectively provide a voltage source.

The inclusion of a selectively operable voltage source in each primary limb portion provides for a further degree of control over the configuration of a primary AC waveform at the corresponding primary AC terminal.

In such embodiments, at least one primary active switching module may include a pair of primary active switching elements connected in parallel with an energy storage device in a half-bridge arrangement to define a 2-quadrant unipolar module that can provide zero or positive voltage and can conduct current in two directions.

In other such embodiments, at least one primary active switching module may include two pairs of primary active switching elements connected in parallel with an energy storage device in a full-bridge arrangement to define a 4-quadrant bipolar module that can provide negative, zero or positive voltage and can conduct current in two directions.

The inclusion of one or more such 2-quadrant and 4-quadrant modules results in a modular arrangement within each primary limb portion that allows easy modification of each primary limb portion according to the requirements of the associated power application.

In embodiments employing the use of one or more primary active switching elements, each primary limb portion may further include at least one primary active switching element connected in series with the or each primary active switching module.

The further inclusion of at least one primary active switching element connected in series with the or each primary active switching module allows the respective primary limb portion to be switched in and out of circuit. This is advantageous because it reduces the total voltage range that the or each primary active switching module is required to generate, and so reduces the number of components required in each primary limb portion.

In embodiments of the invention, each secondary limb portion may further include at least one secondary active switching module, the or each secondary active switching module including first and second sets of series-connected current flow control elements connected in parallel with at least one energy storage device, each set of current flow control elements including a secondary active switching element to selectively direct current through the energy storage device and a secondary passive current check element to limit current flow through the secondary active switching module to a single direction, the current flow control elements and the or each energy storage device combining to selectively provide a voltage source.

The ability to provide a voltage source in the or each secondary converter limb allows the power electronic converter to add or subtract finite steps to the voltage constructed by the respective secondary converter limb.

Preferably the first and second sets of series-connected current flow control elements are connected in parallel with the respective energy storage device in a full-bridge arrangement to define a 2-quadrant bipolar rationalised module that can provide zero, positive or negative voltage while conducting current in a single direction.

In embodiments employing the use of at least one primary active switching element, each active switching element may include an anti-parallel diode connected in parallel therewith The inclusion of an anti-parallel diode with each primary and/or each active switching element allows the power electronic converter to function in a second, simplified, AC to DC power transfer mode.

In such embodiments employing the use of a primary controller, the primary controller when operating in a second AC to DC power transfer mode may switch each of the active switching elements to an off position whereby the respective primary and secondary converter limbs together define a simple diode rectifier.

The ability of the power electronic converter to operate in such a second, simplified AC to DC power transfer mode increases the flexibility with which the power electronic converter may be deployed in a power transfer application.

The power electronic converter may be combined with another DC-to-AC converter to form a chopper-type converter, in which current is transferred across the or each primary converter limb to selectively charge or discharge a respective inductor connected to the or each primary terminal and interconnecting the two converters.

The performance of such a chopper-type converter may be enhanced by modifying the or each secondary converter limb to permit selective charging or discharging of a respective inductor connected to the or each secondary AC terminal and interconnecting the two converters. For example, at least one secondary limb portion may further include at least one auxiliary switching element to selectively allow current to flow through the corresponding secondary limb portion in a second direction from the DC terminals to the corresponding secondary AC terminal.

According to a second aspect of the invention, there is provided a power electronic converter assembly, for interconnecting first and second DC networks, comprising:

a first power electronic converter having first and second DC terminals for connection in use to a first DC network and a plurality of first converter limbs extending between the first and second DC terminals, each first converter limb including first and second first converter limb portions separated by a first converter AC terminal; and a second power electronic converter according to any preceding claim, the second power electronic converter being for connection in use to a second DC network, and each of the primary and secondary AC terminals of the second converter being electrically connected to a corresponding first converter AC terminal.

Preferably the primary and secondary AC terminals of the second converter are electrically connected with the corresponding first converter AC terminal via a transformer.

The first power electronic converter preferably further includes a first controller to control the first converter limbs to selectively direct current to flow through or bypass the first DC network.

Selectively directing current in this manner results in the transfer of energy from the second DC network for storage in a transformer or inductor interconnecting the first and second converters when the current bypasses the first DC network, and the release of energy from the transformer or inductor for transfer to the first DC network when the current flows through the first DC network.

BRIEF DESCRIPTION OF THE DRAWINGS

Preferred embodiments of the invention will now be described, by way of non-limiting examples, with reference to the accompanying drawings in which.

DETAILED DESCRIPTION

Figure 1:
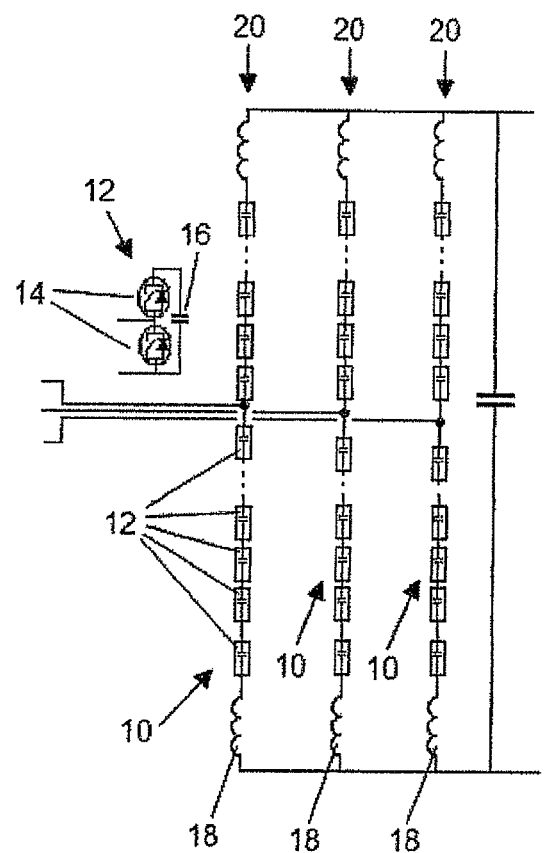
FIG. 1 shows a prior art voltage source converter.
Figure 2:
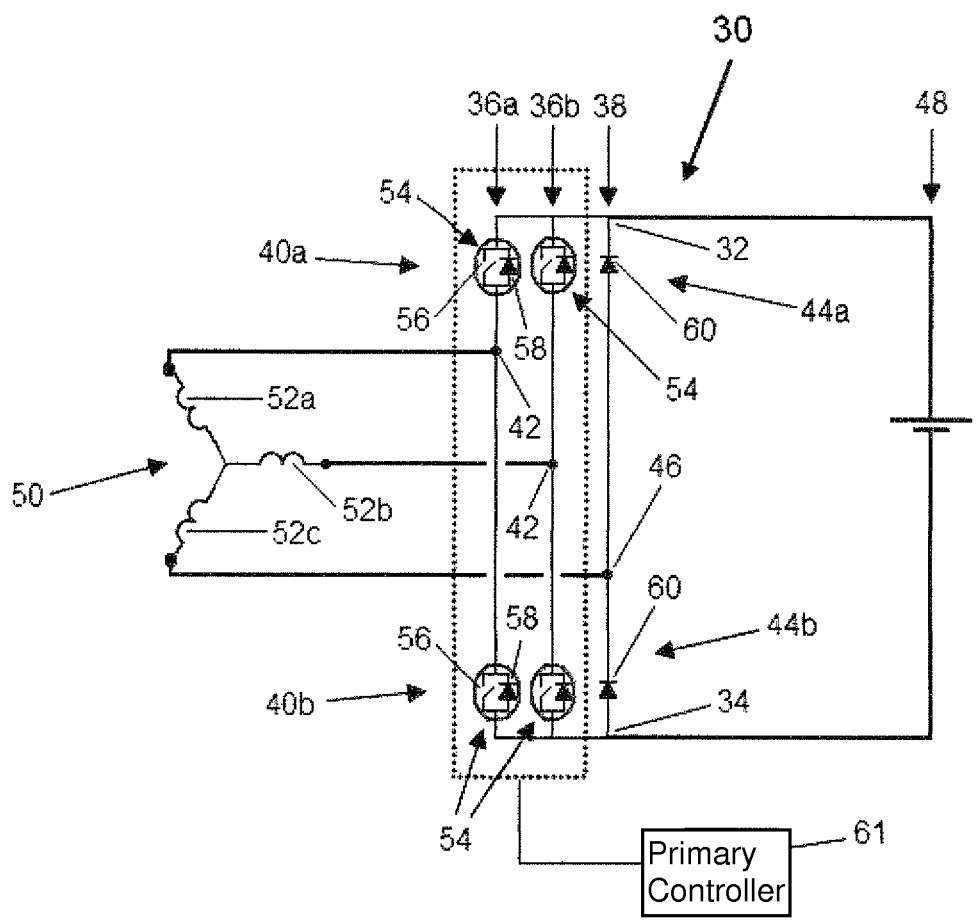
FIG. 2 shows a power electronic converter according to a first embodiment of the invention.

A power electronic converter 30 according to a first embodiment of the invention is shown in FIG. 2.

The power electronic converter 30 comprises first and second DC terminals 32,34, two primary converter limbs 36a, 36b and one secondary converter limb 38. Each primary converter limb 36a,36b extends between the first and second DC terminals 32,34 and has first and second primary limb portions 40a,40b that are separated by a primary AC terminal 42, while the secondary converter limb 38 extends between the first and second DC terminals 32,34 and has first and second secondary limb portions 44a,44b that are separated by a secondary AC terminal 46.

In use, the first and second DC terminals 32,34 are respectively connected to positive and negative terminals of a DC network 48, while each of the primary and secondary AC terminals 42,46 is connected to a respective phase of a three-phase AC network 50. In the arrangement shown, each phase of the three-phase AC network 50 is associated with a respective winding 52a,52b,52c of a transformer, the three windings 52a,52b,52c being connected to define a star configuration.

It is envisaged that in other embodiments (not shown) the three windings of the transformer may be connected to define a delta configuration.

It is further envisaged that in other embodiments (not shown), the power electronic converter may have any number of primary and secondary converter limbs so as to be compatible with an AC network having a corresponding number of phases and to meet the operating requirements of the associated power application. For example, the power electronic converter may have one primary converter limb and two secondary converter limbs to interconnect, in use, a DC network and a three-phase AC network.

In each primary converter limb 36a,36b, the first and second primary limb portions 40a,40b each includes a primary active switching module 54. Each primary active switching module 54 includes a primary active switching element 56 in the form of a insulated gate bipolar transistor (IGBT) connected in parallel with an anti-parallel diode 58.

In other embodiments of the invention (not shown), it is envisaged that one or more primary active switching elements may be a different semiconductor device such as a gate turn-off thyristor, a field effect transistor (FET), an insulated gate commutated thyristor, or an integrated gate commutated thyristor. In each instance, the semiconductor device is preferably connected in parallel with an anti-parallel diode.

In the secondary converter limb 38, the first and second secondary limb portions 44a,44b each includes a passive current check element 60 in the form of a diode.

The power electronic converter 30 further includes a primary controller 61, which switches the primary active switching modules 54 in each primary limb portion 40a,40b to control the power electronic converter 30 in an AC to DC power transfer mode and a DC to AC power transfer mode to transfer power between the AC and DC networks 50,48.

Figure 3A:
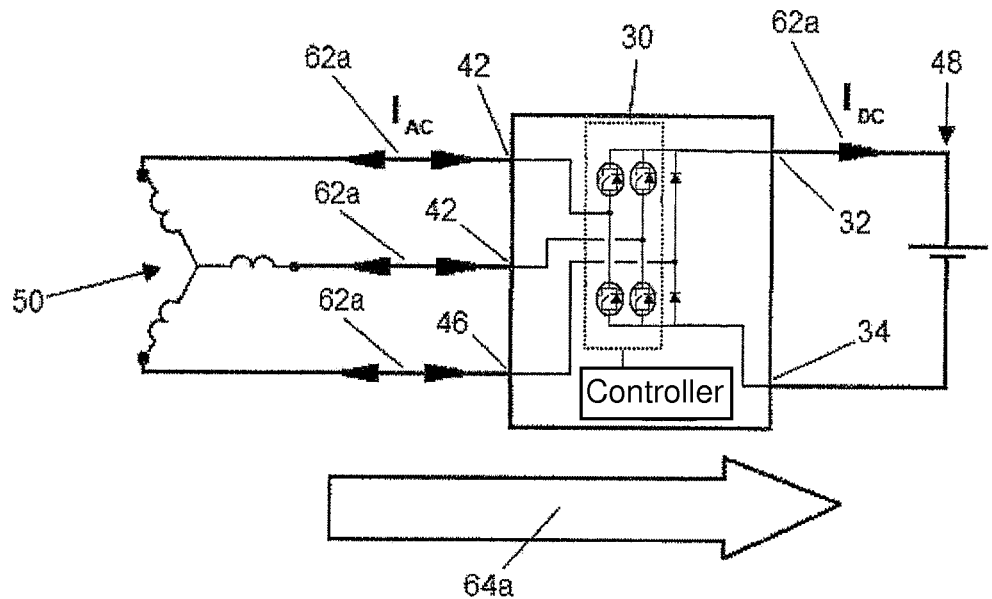
FIGS. 3a and 3b illustrate the operation of the power electronic converter of FIG. 2 in AC to DC and DC to AC power transfer modes respectively.
Figure 3B:
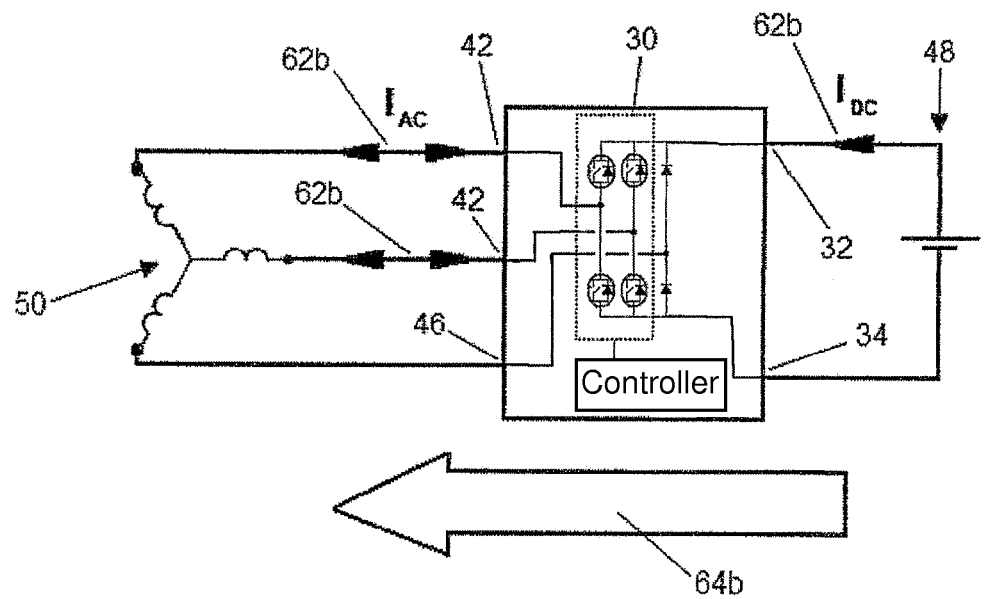

Operation of the power electronic converter 30 in each of the aforementioned power transfer modes, to convert power between the AC and DC networks 50,48, is described as follows with reference to FIGS. 3a and 3b.

When operating in a first AC to DC power transfer mode, the primary controller 61 selectively switches the IGBTs in the primary converter limbs 36a,36b to control the configuration of a primary AC waveform at each corresponding primary AC terminal 42. Each primary AC waveform has a sinusoidal waveform and a phase difference of 120 electrical degrees to the primary AC waveform at the other primary AC terminal 42.

The phase currents in the connected three-phase AC network 50 sum to zero, and so the configuration of the primary AC waveforms controls the configuration of a secondary AC waveform at the secondary AC terminal 46. In particular, the secondary AC waveform is also a sinusoidal waveform and also has a phase difference of 120 electrical degrees to each primary AC waveform at each corresponding primary AC terminal 42.

In other embodiments of the invention the shape and the phase difference of various AC waveforms may vary depending on the operating requirements of the connected AC and DC networks 50,48.

When operating in a second AC to DC power transfer mode, the primary controller 61 selectively switches the IGBTs in the primary converter limbs 36a,36b to an off position so that the primary and secondary converter limbs 36a, 36b,38 together define a diode rectifier.

In each of the aforementioned AC to DC power transfer modes, the use of the primary controller 61 to selectively switch the IGBTs in the primary converter limbs 36a,36b results in the flow of current 62a through each of the primary converter limbs 36a,36b in a first direction from each corresponding primary AC terminal 42 to the DC terminals 32,34 and through the secondary converter limb 38 in the same first direction from the secondary AC terminal 46 to the DC terminals 32,34. This permits the power electronic converter 30 to transfer power 64a from the AC network 50 to the DC network 48 across each of the primary and secondary converter limbs 36a,36b,38, as shown in FIG. 3a. In such a mode the power electronic converter 30 provides full power transfer functionality.

When operating in a DC to AC power transfer mode, the primary controller 61 selectively switches the IGBTs in each primary converter limb 36a,36b to synthesise a primary AC waveform at each corresponding primary AC terminal 42. Each primary AC waveform is a sinusoidal waveform which has a phase difference of 180 electrical degrees to the primary AC waveform at the other primary AC terminal 42. Since the phase currents at the primary and secondary AC terminals 42,46 must sum to zero, such configurations of the primary AC waveforms at the primary AC terminals 42 inhibit the synthesis of a secondary AC waveform at the secondary AC terminal 46.

In the aforementioned DC to AC power transfer mode, the use of the primary controller 61 to selectively switch the IGBTs in the primary converter limbs 36a,36b results in the flow of current 62b through each of the primary converter limbs 36a,36b in a second direction from the DC terminals 32,34 to each corresponding primary AC terminal 42. No current flows in the secondary converter limb 38. Thus the power electronic converter 30 is able to transfer power 64b from the DC network 48 to the AC network 50 across each of the primary converter limbs 36a,36b, as shown in FIG. 3b. In such a mode, with the absence of power transfer via the secondary converter limb 38, the power electronic converter 30 provides a reduced power transfer functionality.

Accordingly the above configuration of the primary and second converter limbs 36a,36b,38 therefore results in a power electronic converter 30 which has full power transfer functionality from the AC network 50 to the DC network 48 and reduced power transfer functionality from the DC network 48 to the AC network 50, i.e. a power electronic converter 30 which has asymmetrical power transfer characteristics with a lower reverse power flow from the DC network 48 to the AC network 50.

The power electronic converter 30 is, therefore, well-suited to power transfer applications where there is a heavy bias towards the export of power to a DC network 48 and a minimal need to import power, such as arises in renewable wind and tidal power generation where the required power transfer is predominately from the source to a distribution grid. Other examples of suitable applications for the power electronic converter 30 include use in a power grid to accommodate a single-phase load, such as traction power supply, or to correct an inherent imbalance in a three-phase power grid.

Meanwhile the inclusion of one or more passive current check elements 60 in each of the first and second secondary limb portions 44a,44b reduces considerably the number of active switching modules in the power electronic converter 30 while maintaining the respective degrees of power transfer functionality between the AC and DC networks 50,48, as set out above. The power electronic converter is therefore able to provide a desired degree of power transfer functionality in a cost- and resource-efficient manner because it omits underutilised parts.

Passive current check elements 60 are lighter, smaller, and simpler than active switching modules, and hence less expensive and more reliable too. The resulting power electronic converter 30 is therefore able to provide a small, lightweight, inexpensive, and reliable means of connecting the AC and DC networks 50,48 and transferring power therebetween.

In addition, the reduced number of components in the secondary converter limb 38 not only improves the reliability of the power electronic converter 30, but also reduces switching losses in the power electronic converter 30 during the transfer of power between the AC and DC networks 50,48.

Figure 4A:
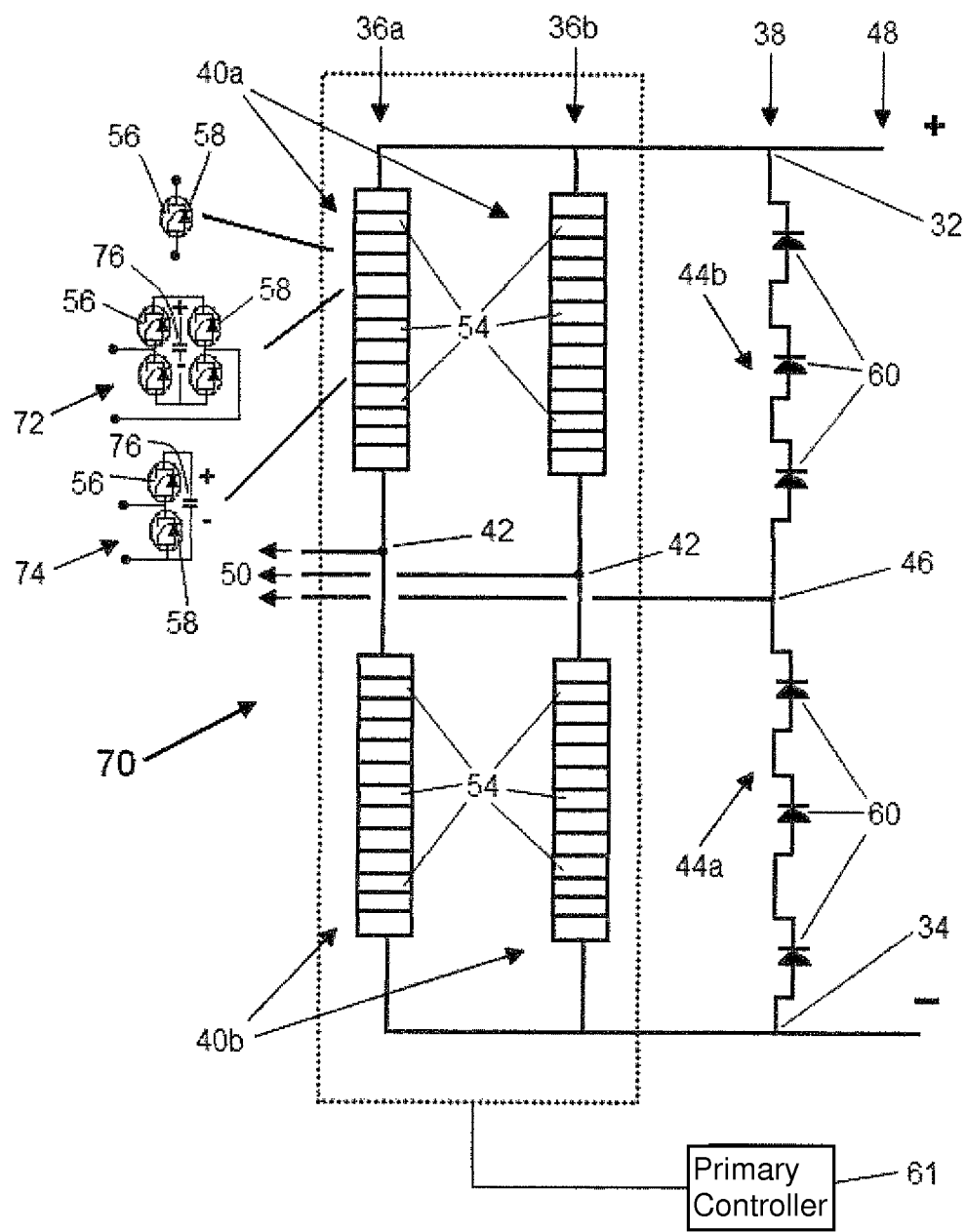
FIGS. 4a and 4b show a power electronic converter according to second and third embodiments of the invention.

A power electronic converter 70 according to a second embodiment of the invention is shown in FIG. 4a. The second power electronic converter 70 is similar in terms of structure and operation to the first power electronic converter 30 shown in FIG. 2, and like features share the same reference numerals.

The second power electronic converter 70 differs from the first power electronic converter 30 in that each primary limb portion 40a,40b includes a plurality of series-connected primary active switching modules 54 and each secondary limb portion 44a,44b includes a plurality of series-connected passive current check elements 60.

The number of primary active switching modules 54 in each primary limb portion 40a,40b and the number of passive current check elements 60 in each secondary limb portion 44a,44b may vary depending on the required voltage rating of the second power electronic converter 70.

In the second power electronic converter 70, each primary active switching module 54 may include: a primary active switching element 56; and/or a 4-quadrant bipolar module 72; and/or a 2-quadrant unipolar module 74.

In a first variant of the second power electronic converter 70, each primary active switching module 54 is a primary active switching element 56 in the form of an IGBT connected in parallel with an anti-parallel diode 58. In use, the primary controller 61 selectively switches the plurality of IGBTs in each primary converter limb 36a,36b to control the configuration of a primary AC waveform at each corresponding primary AC terminal 42. The primary controller 61 again operates the plurality of IGBTS in each primary converter limb 36a, 36b in a first AC to DC power transfer mode or a DC to AC power transfer mode to produce similar AC waveforms at the primary and secondary AC terminals 42,46 to those described hereinabove in relation to the first power electronic converter 30 of FIG. 2.

In a second AC to DC power transfer mode, the primary controller 61 again switches each of the plurality of IGBTs in the primary converter limbs 36a,36b to an off position so that the respective primary and secondary converter limbs 36a, 36b,38 together define a diode rectifier.

The first variant of the second power electronic converter 70 is therefore able to provide similar asymmetrical power transfer between the AC and DC networks 50,48, with a lower reverse power flow from the DC network 48 to the AC network 50, to the first power electronic converter 30.

In a second variant of the second power electronic converter 70, each primary active switching module 54 is a 4-quadrant bipolar module 72, and so each primary limb portion 40a, 40b defines a plurality of series-connected 4-quadrant bipolar modules 72 which together form a first primary chain-link converter.

Each 4-quadrant bipolar module 72 includes two pairs of primary active switching elements 56 connected in parallel with an energy storage device, in the form of a capacitor 76. Each 4-quadrant bipolar module 72 can therefore provide negative, zero or positive voltage and can conduct current in two directions. Each primary active switching element 56 of each 4-quadrant bipolar module 72 is a semiconductor device in the form of an IGBT connected in parallel with an anti-parallel diode 58.

It is envisaged that in other embodiments of the invention (not shown), the capacitor in each active switching module may be replaced by a different energy storage device such as a fuel cell, a battery or any other energy storage device capable of storing and releasing its electrical energy to provide a voltage.

The capacitor 76 of each 4-quadrant bipolar module 72 is selectively bypassed or inserted into each corresponding chain-link converter by changing the state of the primary active switching elements 56 of each corresponding 4-quadrant bipolar module 72 so as to define a voltage source.

In particular, the capacitor 76 of each 4-quadrant bipolar module 72 is bypassed when the pairs of primary active switching elements 56 in each 4-quadrant bipolar module 72 are configured to form a short circuit in the 4-quadrant bipolar module 72. This causes the current in the power electronic converter 70 to pass through the short circuit and bypass the capacitor 76, and so the 4-quadrant bipolar module 72 provides a zero voltage.

The capacitor 76 of each 4-quadrant bipolar module 72 is inserted into each corresponding primary chain-link converter when the pair of primary active switching elements 56 in each 4-quadrant bipolar module 72 is configured to allow the converter current to flow into and out of the capacitor 76. The capacitor 76 then charges or discharges its stored energy so as to provide a voltage. The bidirectional nature of the 4-quadrant bipolar module 72 means that the capacitor 76 may be inserted into the 4-quadrant bipolar module 72 in either forward or reverse directions so as to provide a positive or negative voltage.

It is therefore possible to build up a combined voltage across each primary chain-link converter, i.e. each primary limb portion 40a, 40b, which is higher than the voltage available from each individual active switching module 72 via the insertion of the capacitors of multiple active switching modules 72, each providing its own voltage, into the chain-link converter.

In this manner switching of the primary active switching elements 56 of each 4-quadrant bipolar module 72 in each primary chain-link converter causes each corresponding primary chain-link converter to provide a stepped variable voltage source. The switching elements of the 4-quadrant bipolar modules 72 are preferably switched at near to the fundamental frequency of the AC network 50.

In a third variant of the second embodiment of the power electronic converter, each primary active switching module 54 is a 2-quadrant unipolar module 74, and so each primary limb portion defines a plurality of series-connected 2-quadrant unipolar modules 74 which together form a second primary chain-link converter.

Each 2-quadrant unipolar module 74 includes a pair of primary active switching elements 56 connected in parallel with a capacitor 76, and so can provide zero or positive voltage and can conduct current in two directions. Each primary active switching element 56 of each 2-quadrant bipolar module 74 is a semiconductor device in the form of an IGBT 56 connected in parallel with an anti-parallel diode 58.

In each of the second and third variants of the second power electronic converter 70 a primary controller 61 varies the timing of switching operations for each type of primary active switching module 72,74 in each primary chain-link converter to generate a voltage waveform at each primary AC terminal 42.

In particular in the embodiment shown the primary active switching modules 72,74 in each primary chain-link converter are switched by the primary controller 61 to generate a sinusoidal primary AC waveform at each corresponding primary AC terminal 42 using a step-wise approximation.

Moreover the ability of the primary chain-link converters to provide voltage steps, as set out above, allows them to increase or decrease the voltage generated at each corresponding primary AC terminal 42.

In use, therefore the primary controller 61 is able to selectively switches the IGBTs in each primary chain-link converter to vary the voltage across each primary chain-link converter and thereby control the configuration of the primary AC waveform at each corresponding primary AC terminal 42.

In particular the primary controller 61 switches the IGBTs in a first AC to DC power transfer mode to generate respective primary AC waveforms at the primary AC terminals 42 that are 120 electrical degrees apart (and hence give rise to a secondary AC waveform at the secondary AC terminal 46 that is 120 electrical degrees apart from both of the primary AC waveforms), or in a DC to AC power transfer mode to generate respective primary AC waveforms at the primary AC terminals 42 that are 180 electrical degrees apart (and hence inhibit the creation of a secondary AC waveform at the secondary AC terminal).

When the third variant of the second power electronic converter is operating in a second AC to DC power transfer mode, the primary controller 61 switches the IGBTs in the primary active switching module 74 to an off position so that the anti-parallel diodes 58 in the primary converter limb 36a, 36b and the passive current check elements 60 in the secondary converter limb 38 together define a diode rectifier.

The second and third variants of the second power electronic converter 70 therefore also provides asymmetrical power transfer between the AC and DC networks 50,48 with a lower reverse power flow from the DC network 48 to the AC network 50.

In a fourth variant (not shown) of the second power electronic converter 70, each primary limb portion 40a,40b further includes a plurality of primary active switching elements 56 connected in series with a first or second primary chain-link converter described above.

The number of primary active switching elements 56 connected in series with each corresponding primary chain-link converter and the number of primary active switching modules 54 in each primary chain-link converter varies depending on the required voltage rating of the power electronic converter 70.

The series-connected primary active switching elements 56 may lie adjacent to the primary AC terminal 42 or the corresponding first or second DC terminal 32,34, or may be distributed within the primary chain-link converter so that at least one primary active switching element 58 is connected in series between the primary active switching modules 56 of the primary chain-link converter.

In use, the primary controller 61 of the fourth variant is able, additionally, to control the series-connected primary active switching elements 56 to switch each corresponding primary chain-link converter in and out of circuit between the primary AC terminal 42 and the corresponding first or second DC terminal 32,34. This reduces the voltage range that each primary chain-link converter would be required to generate. This in turn allows the number of components in each primary chain-link converter to be minimized. Otherwise the fourth variant of the second power electronic converter 70 operates in the same manner as the corresponding second or third variant.

Figure 4B:
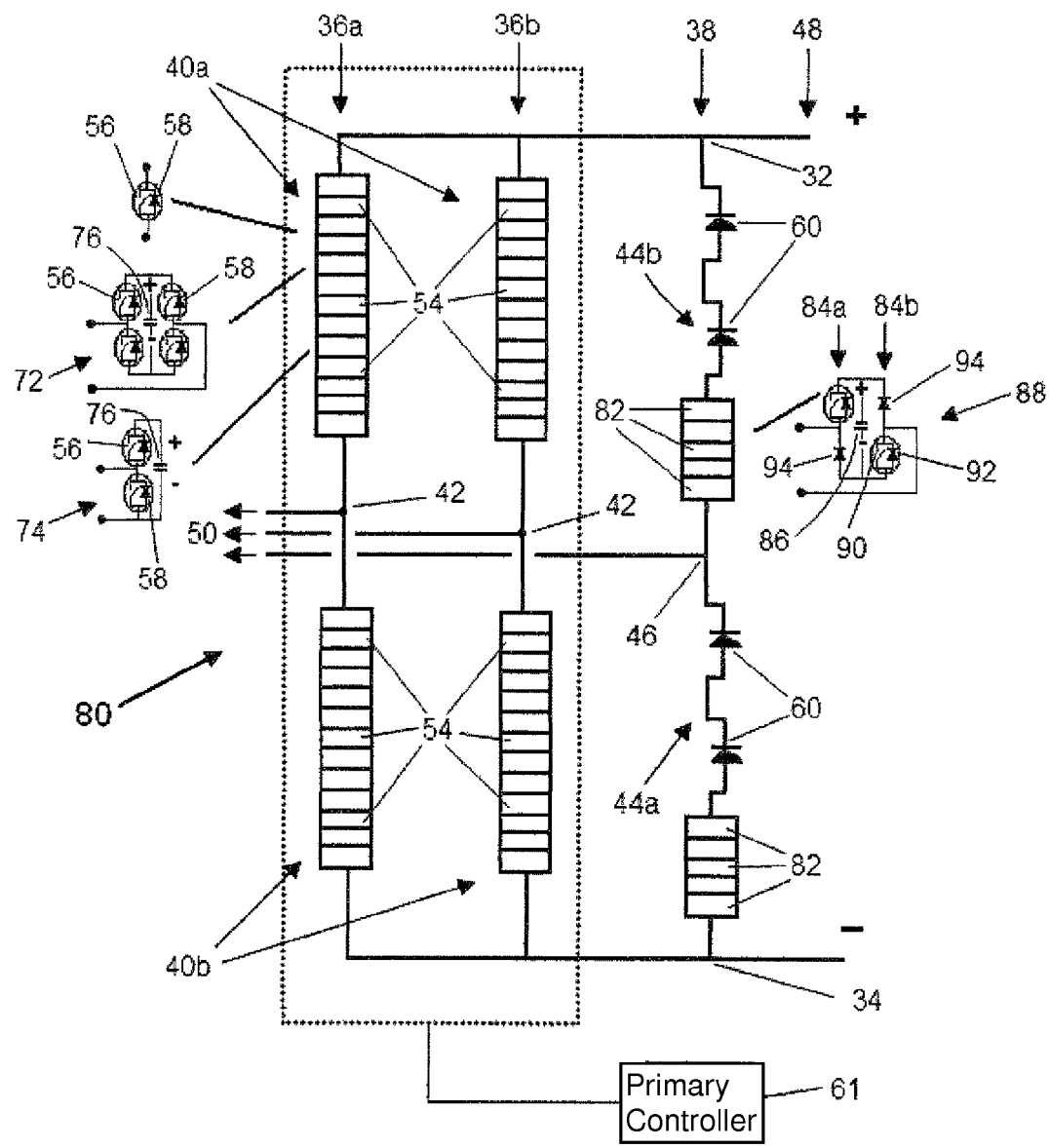

A power electronic converter 80 according to a third embodiment of the invention is shown in FIG. 4b. The third embodiment of the power electronic converter 80 in FIG. 4b is similar in terms of structure and operation to the second embodiment of the power electronic converter 70 in FIG. 4a, and like features share the same reference numerals.

The third power electronic converter 80 differs from the second power electronic converter 70 in that each secondary limb portion 44a,44b further includes the plurality of secondary active switching modules 82 connected in series with a plurality of primary passive current check elements 60. The plurality of series-connected secondary active switching modules 82 defines a secondary chain-link converter.

The number of secondary active switching modules 82 in each secondary limb portion 44a,44b may vary depending on the required voltage rating of the third power electronic converter 80.

Each secondary active switching module 82 includes first and second sets of series-connected current flow control elements 84a,84b that are connected in parallel with a capacitor 86 in a full-bridge arrangement to define a 2-quadrant rationalised bipolar module 88 that can provide zero, positive or negative voltage while conducting current in a single direction.

Each set of the series-connected current flow control elements 84a,84b includes a secondary active switching element 90, which in the embodiment shown is an IGBT connected in parallel with an anti-parallel diode 92, to selectively direct current through the capacitor 86, and a secondary passive current check element 94, which is in the form of a diode to limit current flow through the secondary active switching module 82 to a single direction.

In other embodiments of the invention (not shown), it is envisaged that each secondary active switching element may be a different semiconductor device such as a gate turn-off thyristor, a field effect transistor (FET), an insulated gate commutated thyristor, or an integrated gate commutated thyristor. In each instance, the semiconductor device is preferably connected in parallel with an anti-parallel diode.

The ability to provide a voltage source in the secondary converter limb 38 allows the third power electronic converter 80 to add or subtract finite steps to the voltage constructed by the secondary converter limb 38, and provides the power electronic converter 80 with additional utility when operating in a full power transfer mode, i.e. when transferring power from a AC network 50 to an DC network 48.

In addition the unidirectional nature of each secondary active switching module 82 maintains the operational compatibility of the secondary converter limb 38. with each of the primary converter limbs 36a,36b.

Figure 5:
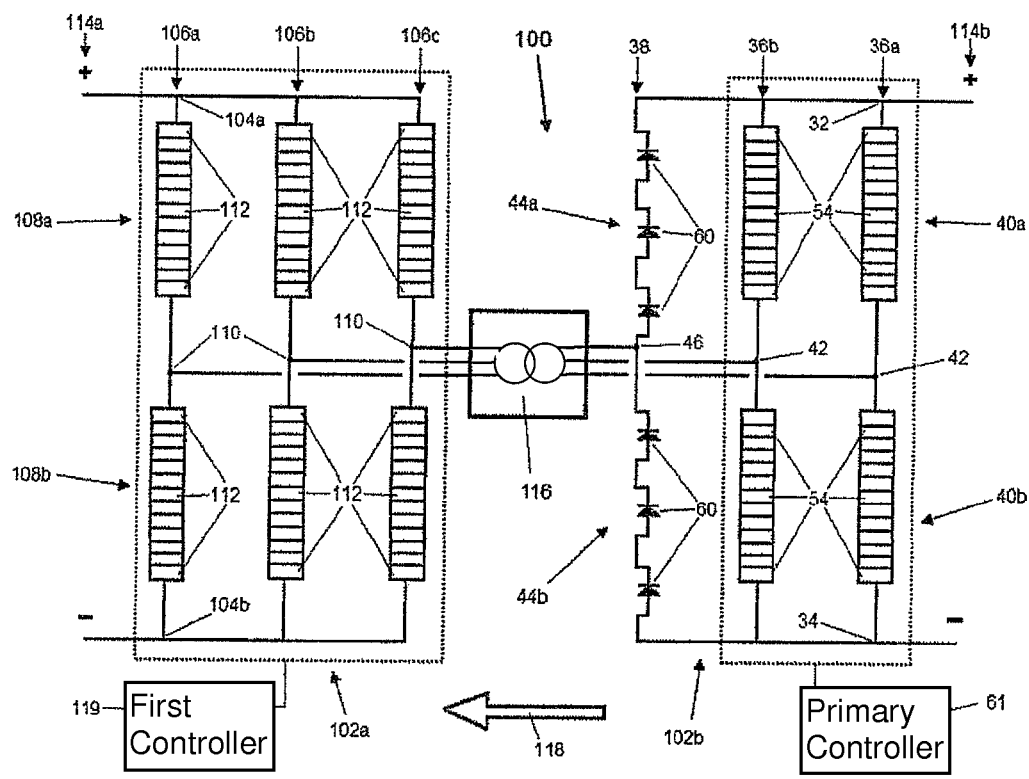
FIG. 5 shows a power electronic converter assembly according to a fourth embodiment of the invention.

A power electronic converter assembly 100 according to a fourth embodiment of the invention is shown in FIG. 5.

The power electronic converter assembly 100 comprises first and second power electronic converters 102a,102b.

The first power electronic converter 102a has first and second DC terminals 104a,104b and three first converter limbs 106a,106b,106c. Each first converter limb 106a,106b, 106c extends between the first and second DC terminals 104a,104b, and includes first and second first converter limb portions 108a,108b that are separated by a first converter AC terminal 110.

Each first converter limb portion 108a,108b includes a plurality of series-connected first converter modules 112 which have one or more components that allow the first power electronic converter 102a to interconnect a DC voltage and an AC voltage. For example, each first converter module 112 may be in the form of a primary active switching element, a passive current check element, or a primary or secondary active switching module as set out above with respect to the other embodiments of the invention.

In the converter assembly embodiment shown the second power electronic converter 102b is identical to the second power electronic converter 70 shown in FIG. 4a. In other converter assembly embodiments the second power electronic converter 102b may be replaced by any other embodiment of the power electronic converter according to the invention.

In use, the first and second DC terminals 104a,104b,32,34 of the first and second power electronic converters 102a,102b are connected to first and second DC networks 114a,114b respectively.

Each of the primary and secondary AC terminals 42,46 of the second power electronic converter 102b is electrically connected via a transformer 116 to a corresponding first converter AC terminal 110 of the first power electronic converter 102a. The transformer 116 performs either a voltage step-up or step-down operation, depending on the operating requirements of the first and second DC networks 114a,114b.

The configuration of the first and second power electronic converters 102a,102b in the power electronic converter assembly 100 therefore provides a DC to DC converter that is capable of transferring power from the second DC network 114a to the first DC network 114a.

The incorporation of the second power electronic converter 102a in such a DC to DC converter is advantageous because it reduces costs and resources by rationalising the converter components included therein while providing full power transfer functionality from the first DC network 114a and a degree of power transfer from the second DC network 114b to the first DC network 114a, albeit at a reduced power transfer level.

Figure 6A:
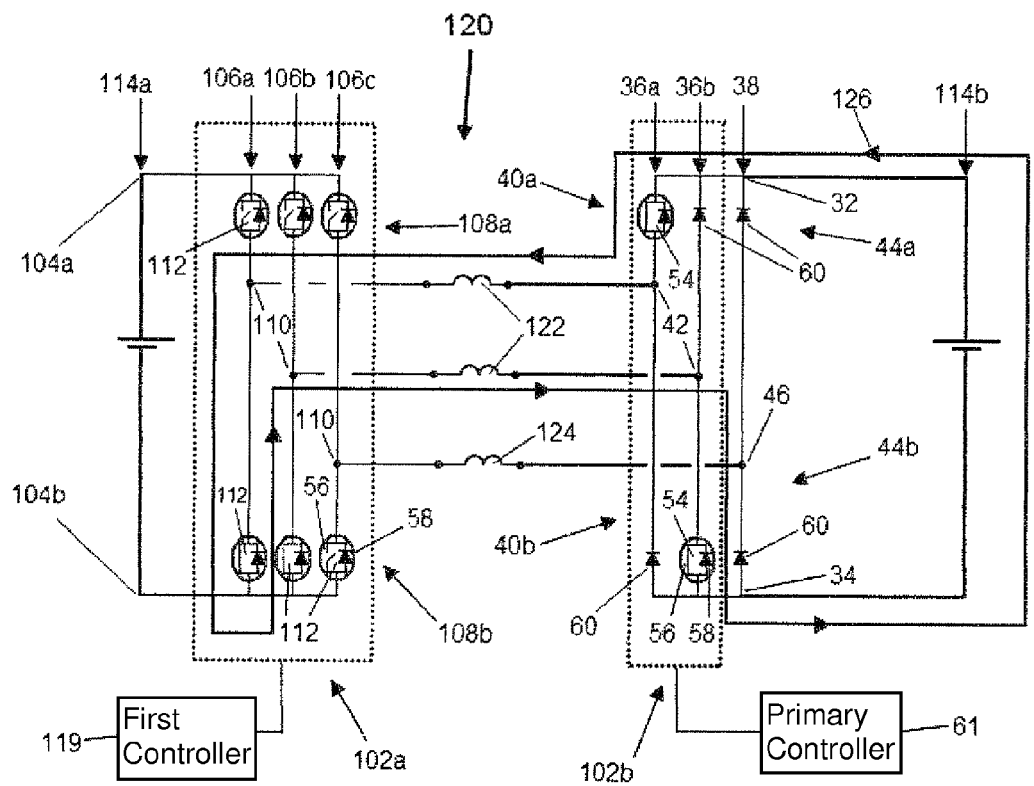
FIGS. 6a and 6b illustrate the operation of a power electronic converter assembly according to a fifth embodiment of the invention.
Figure 6B:
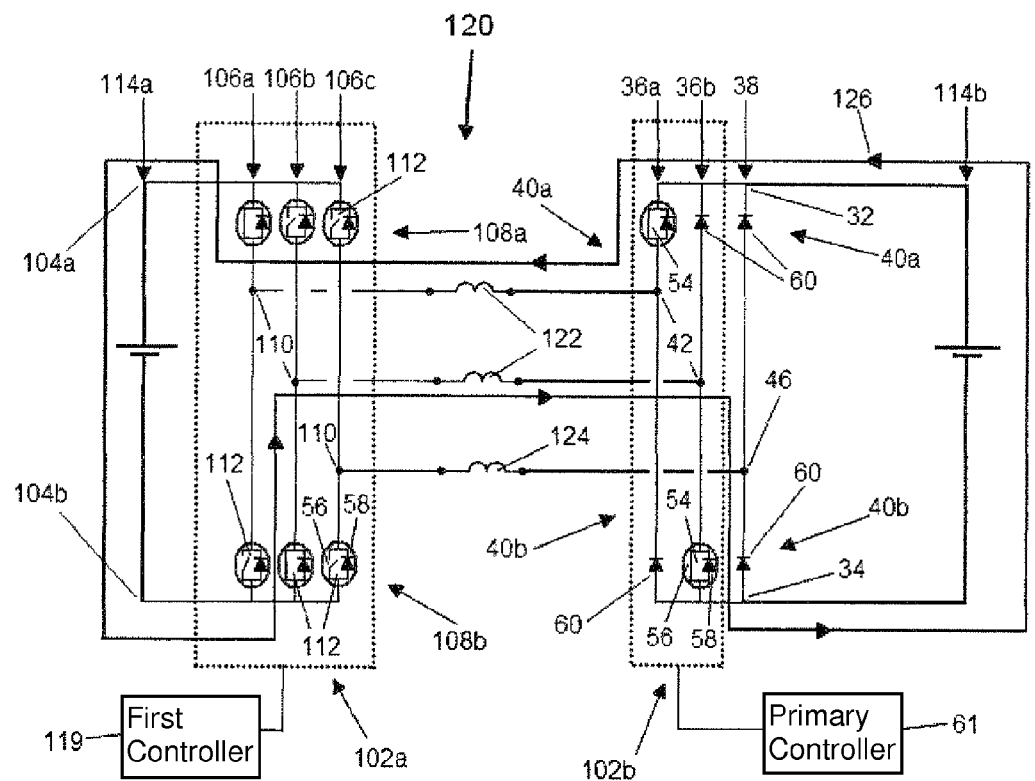

A power electronic converter assembly 120 according to a fifth embodiment of the invention is shown in FIGS. 6a and 6b. The second power electronic converter assembly 120 in FIGS. 6a and 6b is similar in terms of structure and operation to the first power electronic converter assembly 102a in FIG. 5, and like features share the same reference numerals.

The second power electronic converter assembly 102b differs from the first power electronic converter assembly 102a in that:
- in one primary converter limb 36a of the second converter 102b, the first primary limb portion 40a includes a primary active switching module 54 while the second primary limb portion 40b includes a passive check element 60;
- in the other primary converter limb 36b of the second converter 102b, the first primary limb portion 40a includes a passive check element 60 while the second primary limb portion 40b includes a primary active switching module 54;
- each first converter limb 106a,106b,106c of the first converter 102a includes a primary active switching module 112;
- each of the primary AC terminals 42 of the second converter 102b is electrically connected via a primary inductor 122 to a corresponding first converter AC terminal 110 of the first converter 102a; and
- the secondary AC terminal 46 of the second converter 102b is electrically connected via a secondary inductor 124 to a corresponding first converter AC terminal 110 of the first converter 102b.

Each primary active switching module 54,112 includes a primary active switching element 56 in the form of a insulated gate bipolar transistor (IGBT) connected in parallel with an anti-parallel diode 58.

The first converter 102a further includes a first controller 119 to selectively switch the primary active switching modules 112 of the first converter limbs 106a,106b,106c to control current flow within the first converter 102a in an inductor changing mode and an inductor discharging mode.

Operation of the second power electronic converter assembly 120 in the inductor charging and discharging modes is described as follows with reference to FIGS. 6a and 6b.

In both inductor charging and discharging modes the primary controller 61 selectively switches the IGBTs 56 in the primary active switching modules 54 of the primary converter limbs 36a,36b to direct current 126 through the corresponding primary limb portions 40a,40b in a second direction from the DC terminals 32,34 to each corresponding primary AC terminal 42. No current flows in the secondary converter limb 38. At the same time the first controller 119 selectively switches the IGBTs 56 in the primary active switching modules 112 of the first converter limbs 106a,106b,106c to direct current 126 to flow through the first converter AC terminals 110 connected to the primary inductors 122. The operation of the primary and first controllers 61,119 in this manner results in the flow of current 126 between the first and second converters 102a,102b via the primary inductors 122.

When operating in an inductor charging mode, the first controller 119 further selectively switches the IGBTs 56 in the first converter limbs 106a,106b,106c to direct the current 126 to flow through the first converter limbs 106a,106b,106c and bypass the first DC network 114a, as shown in FIG. 6a. This results in the transfer of energy from the second DC network 114b for storage in the primary inductors 122.

When operating in an inductor discharging mode, the first controller 119 further selectively switches the IGBTs 56 in the first converter limbs_106a,106b,106c to direct the current 126 to flow through the first converter limbs 106a,106b,106c and the first DC network 114a, as shown in FIG. 6b. This results in the release of energy from the charged primary inductors 122 for transfer to the first DC network 114a.

Figure 7:
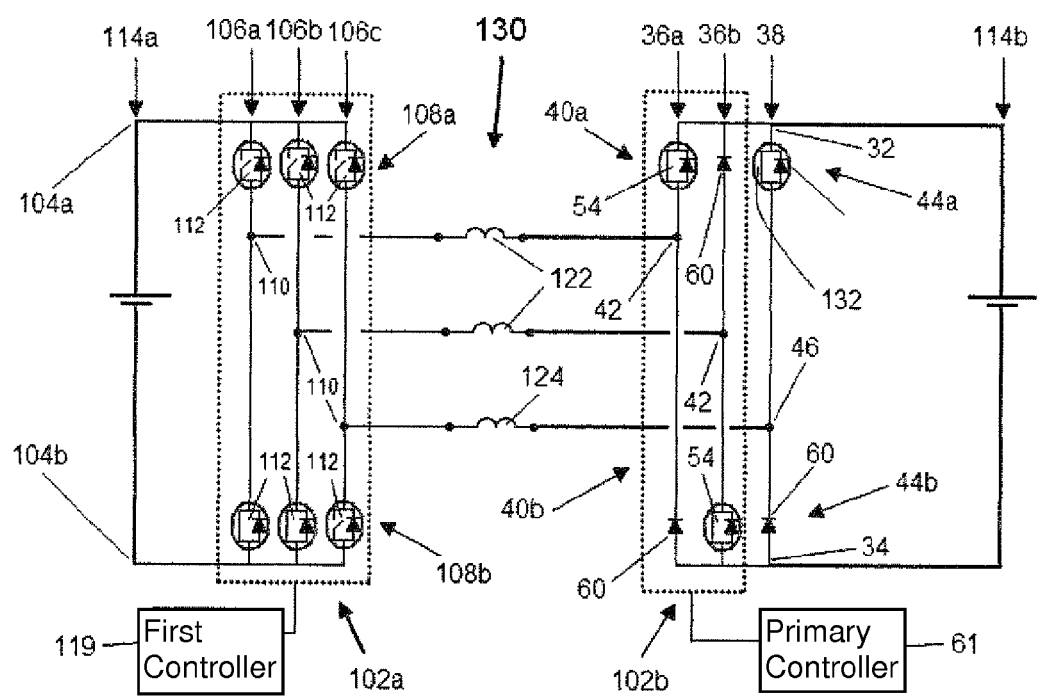
FIG. 7 shows a power electronic converter assembly according to a sixth embodiment of the invention.

A third power electronic converter assembly according to a sixth embodiment of the invention is shown in FIG. 7. The third power electronic converter assembly 130 is similar in terms of structure and operation to the second power electronic converter assembly 120.

The third power electronic converter assembly 130 differs from the second power electronic converter assembly 120 in that the first secondary limb portion 44a of the second converter 102b further includes an auxiliary switching element 132. The auxiliary switching element 132 is configured to allow current to bypass the passive check element 60 of the first secondary limb portion 44a when the auxiliary switching element 132 is turned on. Consequently current may be directed to flow through the first secondary limb portion 44a in a second direction from the DC terminals 32,34 to the corresponding secondary AC terminal 46.

Operation of the third power electronic converter assembly 130 in the inductor charging and discharging modes is similar to the operation of the second power electronic converter assembly 120 in the same modes, except that when the third power electronic converter assembly 130 is operated in either the inductor charging or discharging mode the first controller 119 selectively switches the IGBTs 56 in the primary active switching modules 112 of the first converter limbs 106a, 106b,106c to direct current to flow through the first converter AC terminals 110 connected to the primary and secondary inductors 122,124. The operation of the primary and first controllers 61,119 in this manner results in the flow of current between the first and second converters 102a,102b via the primary and secondary inductors 122,124.

When operating in an inductor charging mode, the first controller 119 further selectively switches the IGBTs 56 in the first converter limbs 106a,106b,106c to direct the current to flow through the first converter limbs 106a,106b,106c and bypass the first DC network 114a. This results in the transfer of energy from the second DC network 114b for storage in the primary and secondary inductors 122,124.

When operating in an inductor discharging mode, the first controller 119 further selectively switches the IGBTs 56 in the first converter limbs 106a,106b,106c to direct the current to flow through the first converter limbs 106a,106b,106c and the first DC network 114a. This results in the release of energy from the charged primary and secondary inductors 122,124 for transfer to the first DC network 114a.

Accordingly the above configuration of the second and third power electronic converter assemblies 120,130 therefore results in power electronic converter assembles which are able to function as chopper-type converters to transfer power from the second DC network 114b to the first DC network 114a.

The invention claimed is:

1. A power electronic converter, for connecting AC and DC networks and transferring power there between, comprising:
    first and second DC terminals for connection in use to a DC network;
    a plurality of converter limbs compatible with an AC multi-phase network having a corresponding number of phases, among the plurality of converter limbs, at least one primary converter limb and at least one secondary converter limb being provided,
    each of the at least one primary converter limb extending between the first and second DC terminals and having first and second primary limb portions separated by a corresponding primary AC terminal for connection in use to a respective phase of the multi-phase AC network, at least one of the first and second primary limb portions including at least one primary active switching module to selectively allow current to flow through each of the at least one primary converter limb in a first direction from the corresponding primary AC terminal to the first and second DC terminals and in a second direction from the first and second DC terminals to the corresponding primary AC terminal, further each of the at least one of the first and second primary limb portions including at least one primary active switching element connected in series with each of the at least one primary active switching module; and each of the at least one secondary converter limb extending between the first and second DC terminals and having first and second secondary limb portions separated by a corresponding secondary AC terminal for connection in use to a further respective phase of the multi-phase AC network, each of the first and second secondary limb portions including at least one diode to limit current flow through each of the at least one secondary converter limb to a single direction from the corresponding secondary AC terminal to the first and second DC terminals;

a primary controller to selectively switch each of the at least one primary active switching module, the primary controller being configured to switch each of the at least one primary active switching module in a AC to DC power transfer mode and in a DC to AC power transfer mode, wherein the primary controller when operating in a DC to AC power transfer mode selectively switches each of the at least one primary active switching module in each of the at least one primary converter limb to synthesise a primary AC waveform at the corresponding primary AC terminal, the primary AC waveform at the corresponding primary AC terminal having a configuration which inhibits the synthesis of a secondary AC waveform at the corresponding second AC terminal of each of the at least one secondary converter limb, the power electronic converter having a full power transfer functionality from the AC network to the DC network and a reduced power transfer functionality from the DC network to the AC network, wherein each of the at least one primary switching module includes one or more sets of series-connected primary active switching elements connected in parallel with an energy storage device to selectively provide a voltage source.

2. The power electronic converter according to claim 1, including two primary converter limbs and one secondary converter limb, wherein each of the corresponding primary and secondary AC terminals is for connection in use to a respective phase of a three-phase AC network.

3. The power electronic converter according to claim 1, wherein the primary controller when operating in a first AC to DC power transfer mode selectively switches each of the at least one primary active switching module in each of the at least one primary converter limb to control the configuration of the primary AC waveform at the corresponding primary AC terminal, the primary AC waveform at the corresponding primary AC terminal being configured to control the configuration of the secondary AC waveform at the corresponding secondary AC terminal of each of the at least one secondary converter limb.

4. The power electronic converter according to claim 1, wherein each of the at least one primary active switching module includes one set of series-connected primary active switching elements connected in parallel with the energy storage device in a half-bridge arrangement to define a 2-quadrant unipolar module that can provide zero or positive voltage and can conduct current in two directions.

5. The power electronic converter according to claim 1, wherein each of the at least one primary active switching module includes two sets of series-connected primary active switching elements connected in parallel with the energy storage device in a full-bridge arrangement to define a 4-quadrant bipolar module that can provide negative, zero or positive voltage and can conduct current in two directions.

6. The power electronic converter according to claim 1, wherein each of the least one secondary limb portion further includes at least one secondary active switching module, each of the at least one secondary active switching module including first and second sets of series-connected current flow control elements connected in parallel with at least one energy storage device, each of the first and second sets of series-connected current flow control elements including a secondary active switching element to selectively direct current through each of the at least one energy storage device and a secondary diode to limit current flow through each of the at least one secondary active switching module to a single direction, the first and second sets of series-connected current flow control elements and each of the at least one energy storage device combined to selectively provide a voltage source.

7. The power electronic converter according to claim 6, wherein the first and second sets of series-connected current flow control elements are connected in parallel with the respective energy storage device in a full-bridge arrangement to define a 2-quadrant bipolar rationalised module that can provide zero, positive or negative voltage while conducting current in a single direction.

8. The power electronic converter according to claim 1, wherein each primary active switching element includes an anti-parallel diode connected in parallel therewith.

9. The power electronic converter according to claim 8, wherein the primary controller when operating in a second AC to DC power transfer mode switches each of the active switching elements to an off position whereby the respective primary and secondary converter limbs together define a simple diode rectifier.

* * * * *